United States Patent [19]

Park et al.

[11] Patent Number: 4,579,218
[45] Date of Patent: Apr. 1, 1986

[54] CONVEYOR DRIVE MECHANISM

[75] Inventors: David B. Park, R.D. #2, Box 2730, Spring Grove, Pa. 17362; Gerard J. McDonald; James Snyder, both of York, Pa.

[73] Assignee: David B. Park, Middleboro, Mass.

[21] Appl. No.: 540,645

[22] Filed: Oct. 11, 1983

[51] Int. Cl.⁴ ............................................. B65G 43/00
[52] U.S. Cl. .................................. 198/810; 474/902; 464/62; 464/30; 198/834; 198/856
[58] Field of Search .................. 198/855, 856; 74/411, 74/412 TA; 474/94, 902, 903; 198/810, 834; 464/23, 30, 61, 62

[56] References Cited

U.S. PATENT DOCUMENTS

| | | | |
|---|---|---|---|
| 2,753,703 | 7/1956 | McIntyre | 464/23 |
| 2,908,853 | 10/1959 | Laky et al. | 74/411 |
| 3,240,316 | 3/1966 | Huffman et al. | 198/796 X |
| 3,762,183 | 10/1973 | Bolliger | 464/23 X |
| 3,845,375 | 10/1974 | Stiebel | 198/856 X |

Primary Examiner—Joseph E. Valenza
Assistant Examiner—Jonathan D. Holmes
Attorney, Agent, or Firm—Burns, Doane, Swecker & Mathis

[57] ABSTRACT

A conveyor travels in a helical path and is driven by a plurality of drive sprockets which are mounted on a common drive shaft. Each drive sprocket includes a yieldable portion which moves relative to a ring gear of the sprocket when the conveyor encounters an unyielding resistance. A sensor is activated in response to relative movement of the yieldable portion of the sprocket to provide an indication of which drive sprocket has sensed the resistance to conveyor travel.

12 Claims, 6 Drawing Figures

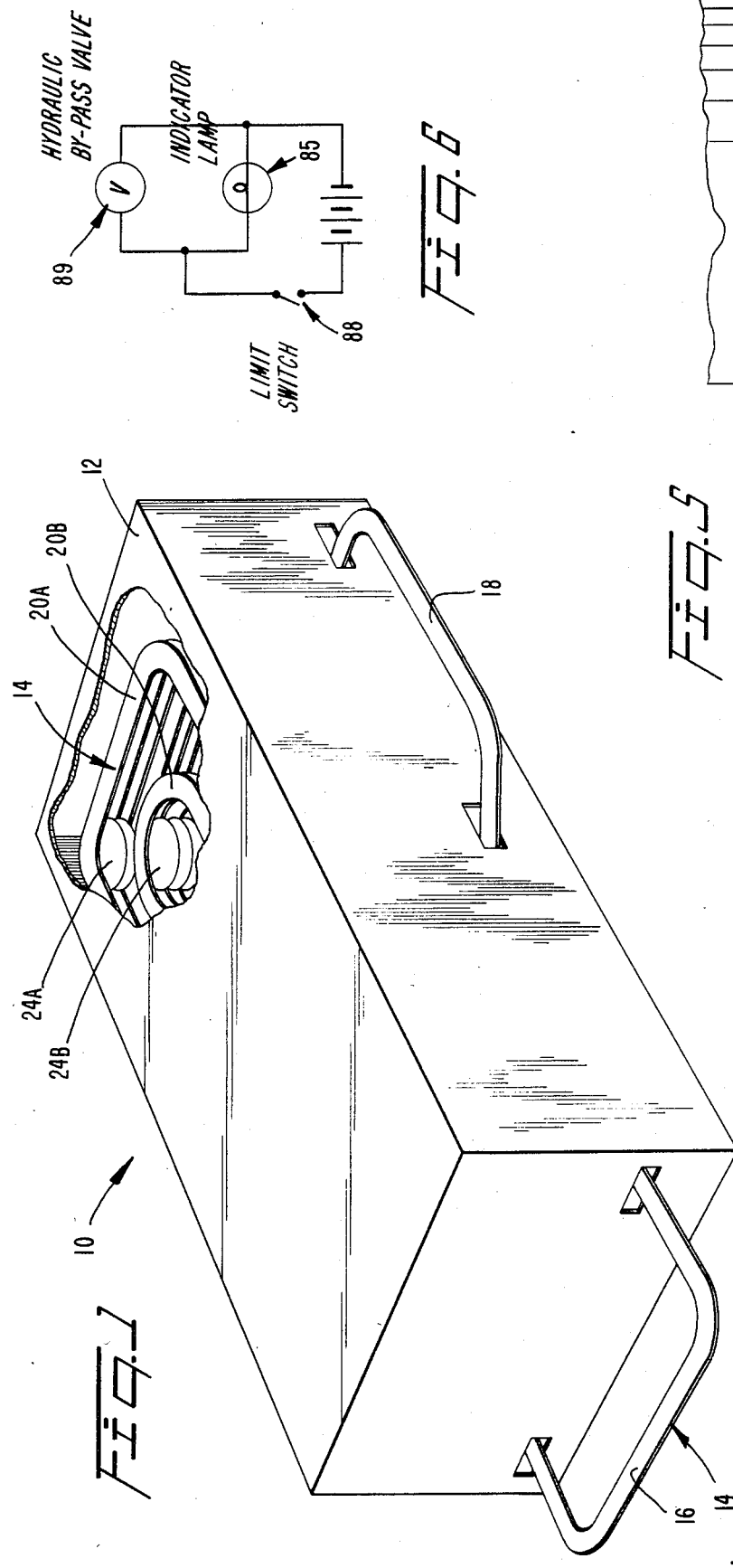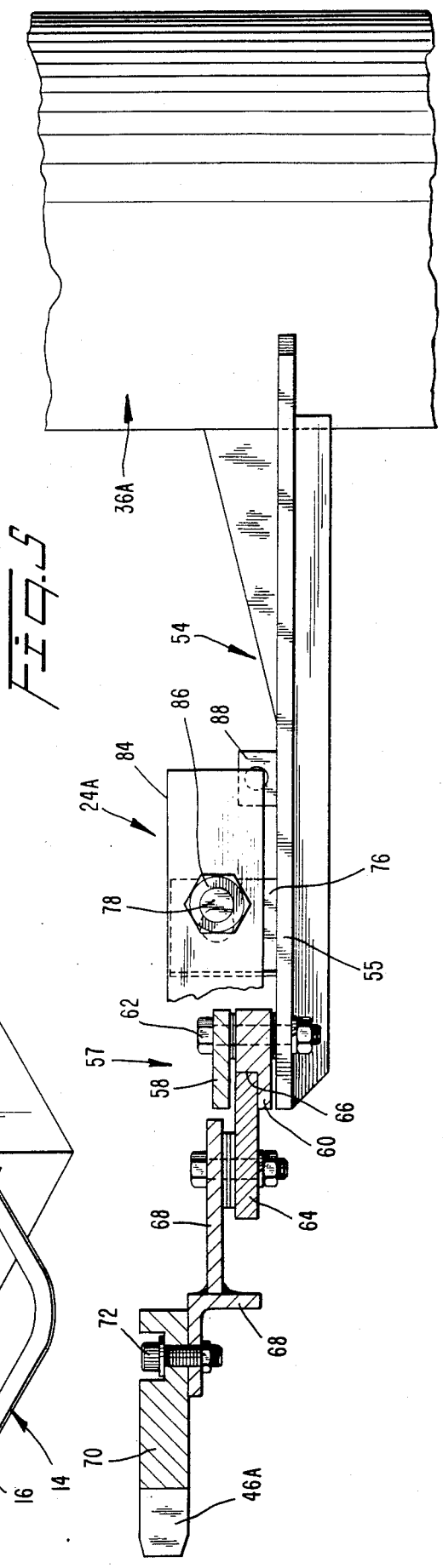

… …

CONVEYOR DRIVE MECHANISM

BACKGROUND AND OBJECTS OF THE INVENTION

The present invention relates to a conveyor drive mechanism and, in particular, to a conveyor drive mechanism having utility in an elongate conveyor system subject to periodic obstructions to travel, for pinpointing the location of the obstruction.

In the conveying of items upon an endless conveyor belt, there may occur unintended stoppages of the conveyor belt. For example, in the treatment of dough products such as bread loaves and rolls, the unproofed dough is conveyed through a proofing chamber. The dough is contained in pans which are carried upon an endless, often helically-arranged transport conveyor. It may occassionally happen that as the pans traverse a curve, adjacent pans may contact one another in such a way as to become jammed in a manner obstructing the motion of the conveyor. The task of locating the pan jam in order to clear same can be time-consuming, especially in a conveyor system which contains many vertically spaced conveyor runs.

Present conveyor system can be equipped with an overload relief mechanism in the drive motor (usually a hydraulic motor) to terminate the driving action in response to the conveyor belt encountering an unyielding obstruction. However, such a mechanism provides no indication as to the location of the obstruction within the system.

It is, therefore, an object of the present invention to minimize or obviate problems of the type discussed above.

A further object is to enable obstructions to conveyor travel to be quickly pin-pointed, especially in an elongate conveyor having many vertically spaced runs.

A further object is to provide a conveyor drive wheel which includes a sensor for sensing a conveyor stoppage. The signal is utilized to shut-off the motor and/or activate an indicator associated with that particular drive wheel to identify same to maintenance personnel and thereby pinpoint the source of the stoppage.

SUMMARY OF THE INVENTION

These objects are achieved by the present invention which relates to a conveying apparatus of the type which comprises an endless conveyor and a plurality of rotary drive members spaced apart along the path of travel of the conveyor. A sensor is carried by at least some of the drive members and is arranged for activation in response to the associated drive member encountering a resistance to conveyor movement greater than a preset amount. The sensor provides a signal for identifying the associated drive member as being that which encountered the resistance.

The conveyor may be of the type which travels in a helical path, with the rotary drive members being mounted on a common vertical drive shaft. Each drive member comprises a rotary force-transmitting mechanism which includes a conveyor engaging portion, a force applying portion connected to the drive shaft, and a yieldable force-transmitting member interconnecting the conveyor engaging portion and the force applying portion. The yieldable force-transmitting member is yieldable to permit the force applying portion to travel relative to the conveyor engaging portion. The sensor is arranged to be activated in response to such relative movement.

Preferably, the force-transmitting member comprises at least one spring.

THE DRAWINGS

The objects and advantage of the invention will become apparent from the following detailed description of a preferred embodiment thereof, in connection with the accompanying drawings, in which like numerals designate like elements, and in which:

FIG. 1 is a perspective view of a proofer with a conveyor traveling therewithin in helical fashion;

FIG. 5 is a vertical cross-sectional view taken through a spoke arm of one of the drive sprockets; and FIG. 6 is a schematic view of a circuit in which activation of a limit switch actuates a hydraulic bypass valve for the drive motor as well as an indicator lamp.

DETAILED DESCRIPTION OF A PREFERRED EMBODIMENT OF THE INVENTION

Figure 2:
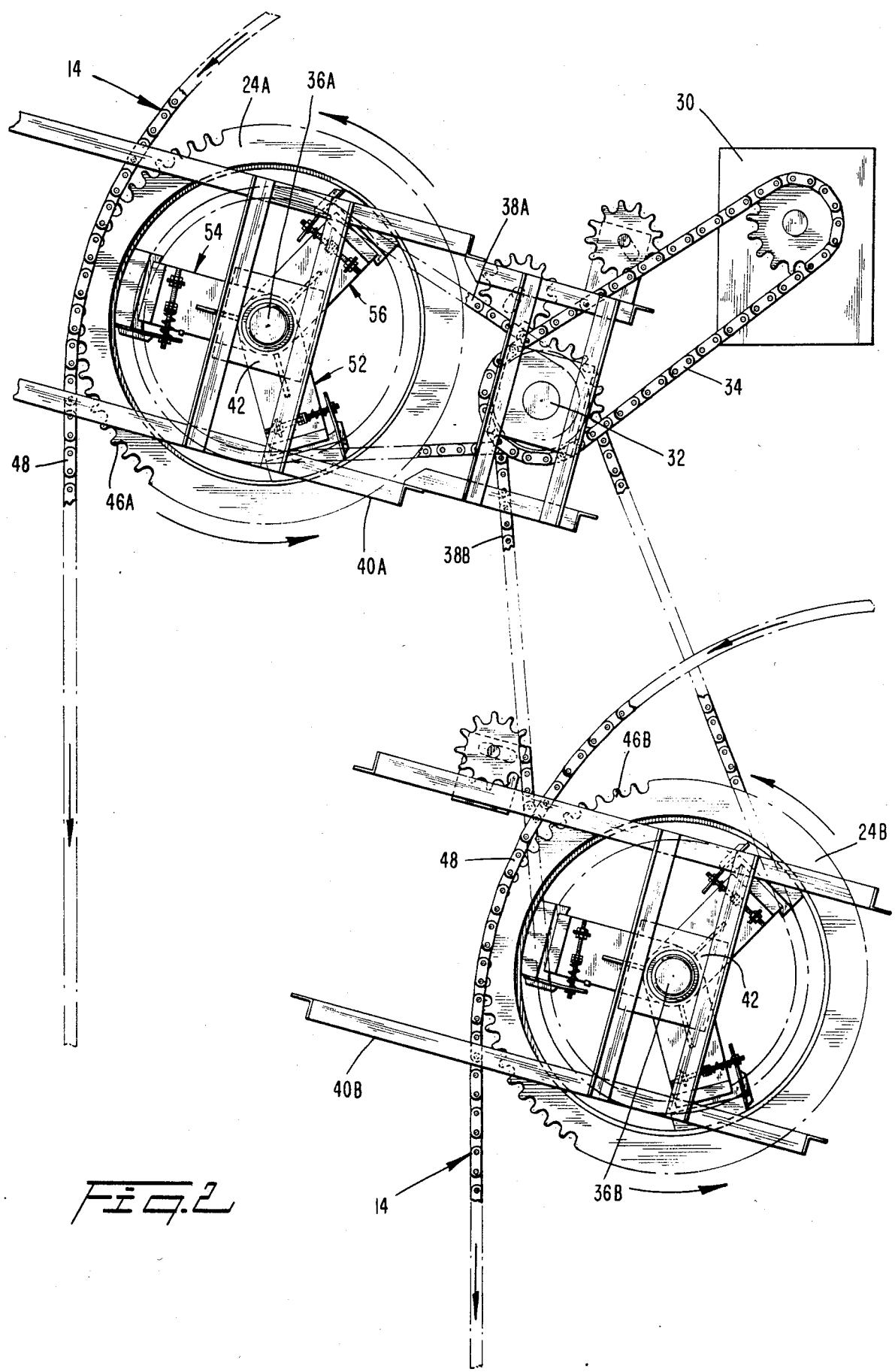
FIG. 2 is a plan view of a portion of a drive mechanism for the conveyor, and depicting chain portions of the conveyor being engaged by ring gears of the drive mechanism.

A proofer 10 for dough products such as bread loaves and rolls, for example, is depicted in FIG. 1. The proofer 10 comprises an enclosure 12 in which desired atmospheric conditions are maintained for the proofing of the dough products.

An endless conveyor belt 14 is arranged to carry pans of dough through the enclosure. The conveyor 14 includes product in-feed and out-feed sections 16, 18 located outside of the enclosure 12, and a pair of helical sections 20A, 20B disposed within the enclosure. Each helical section includes a plurality of vertically spaced runs or tiers, and the helical sections 20A, 20B are interconnected to provide for a continuous travel of pans within the enclosure, e.g., the conveyor may travel upwardly along the outside 20A and then downwardly along the inside 20B.

Each run of the conveyor helices is driven by a force-transmitting rotary wheel 24A, 24B with the wheels for each helical section being mounted on a common drive shaft.

Figure 3:
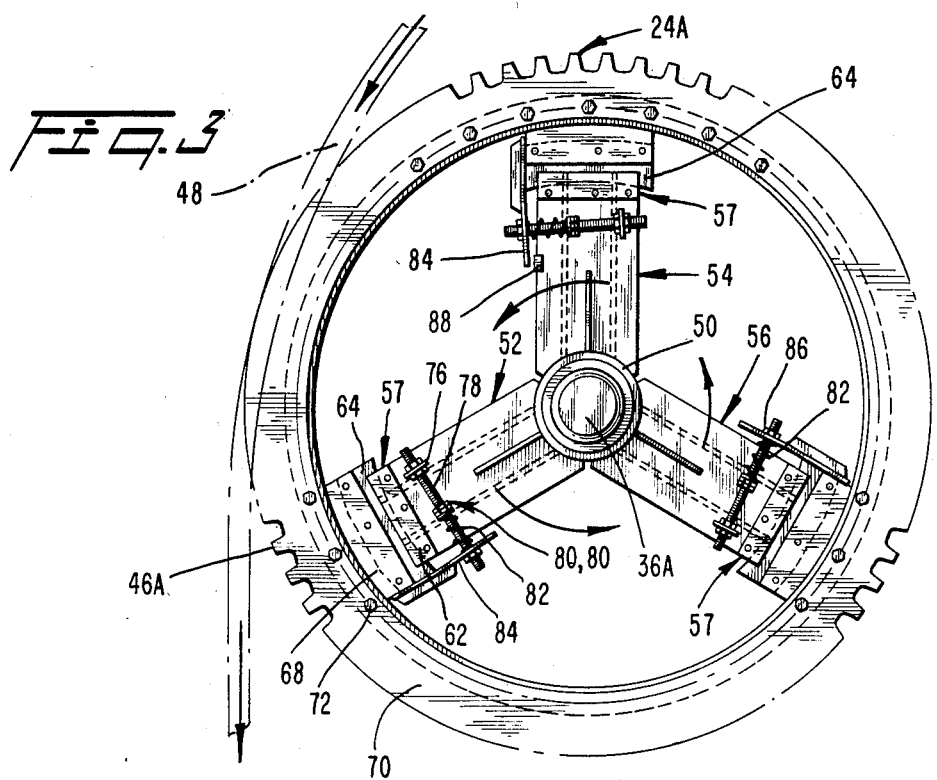
FIG. 3 is a plan view of a rotary drive sprocket in engagement with the conveyor chain.
Figure 4:
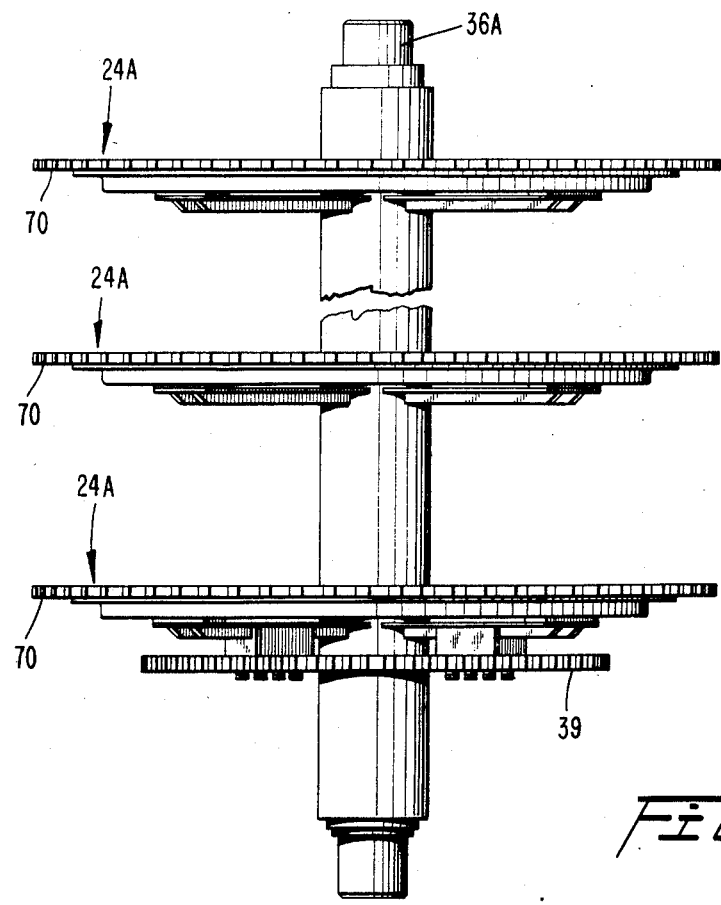
FIG. 4 is a side elevational view of a drive shaft with a plurality of rotary drive sprockets mounted thereon.

The drive system, which is located within the enclosure 12, is depicted more clearly in FIGS. 2-5 and comprises a hydraulic motor 30 (FIG. 2) which rotates a main drive shaft 32 by means of a main sprocket chain 34. The main drive shaft 32 is rotatably mounted in bearings and is situated between two secondary drive shafts 36A, 36B. Secondary sprocket chains 38A, 38B drivingly interconnect the drive shaft 32 with shafts 36A, 36B.

Each secondary drive shaft 36A, 36B is arranged vertically on a support framework 40A, 40B and is rotatably supported at its upper and lower ends by suitable bearings 42. Affixed to each secondary drive shaft 36A, 36B in vertically spaced relationship are the plurality of sprocket-type conveyor drive wheels 24A, 24B. Each drive wheel 24A, 24B is in the form of a sprocket wheel, the teeth 46A, 46B of which are engageable with a chain 48 of the conveyor 14 at a respective run of the conveyor, in order to continuously advance same.

The drive sprockets 24A, 24B are of identical construction, and thus only one of those sprockets 24A will be described in detail. The sprocket 24A (FIG. 3) comprises a hub 50 secured to the drive shaft 36A, and from which eminate three spokes 52, 54, 56. Each spoke includes a radial arm 55 upon which is secured a holder 57 (FIG. 5) in the form of upper and lower holder plates 58, 60 which are secured together and to an outer end of the arm by a plurality of bolts 62. The holder 57 carries a curved slip plate 64 which is seated with a slip fit within a curved groove 66 of the lower holder plate. The groove 66 has a center of curvature which coincides with the axis of rotation of the drive shaft 36A. Shims may be positioned between the holder plates 58, 60 to adjust the spacing therebetween. The slip plate 64 rigidly carries an annular carrier plate 68 to which is connected a conveyor-engaging ring gear 70 by bolts 72. The ring gear 70 includes the teeth 46A which can be formed of plastic and mesh with recesses in the chain 48 of the conveyor 14 to drive same.

Mounted on each arm 55 radially inwardly of the holder 57 is an upstanding tab 76 which adjustably carries a threaded rod 78. The rod 78 carries a pair of nuts 80 which serve as a stop for a coil compression spring 82 that is mounted on the rod 78. The other end of the spring 82 bears against a stop plate 84 which is rigidly attached to the carrier plate 68. The rod 78 extends freely slidably through a hole in the stop plate 84 and carries a stop nut 86 at its outer end which projects beyond the plate 84.

An electrical limit switch 88 is mounted on one of the arms 54 adjacent a radially inner end of the stop plate 84. The limit switch 88 is thus located in trailing relationship to the stop plate 84 in the direction of rotation of the sprocket 24A.

The total strength of the three springs 82 is sufficient to assure that the three slip plates 64, three carrier plates 68 and the ring gear 70, are rotated in slip-free fashion together with the arms 52, 54, 56 during normal driving of the chain. That is, the driving forces from the force-applying arms 52, 54, 56 are transmitted through the springs 82 to the slip assembly composed of the slip rings, carrier plates, ring gear, and stop plate 84. However, if travel of the conveyor chain becomes obstructed, as by a jam-up of articles being conveyed, the nearest downstream drive sprocket (i.e., with reference to the direction of conveyor travel) will be actuated in a manner causing a signal to be produced by the limit switch 88. That is, as the conveyor encounters resistance greater than a preset amount, relative rotation occurs between the radial arm 55 and the slip assembly 64, 68, 70, 84 since the ring gear 70 cannot rotate, or at least not at the same rate as the arm 55. Thus, the arm 55 and holder 57 slide relative to the slip assembly along the groove 66.

Thus, the radial arm 55 will approach the stop plate 84 until the limit switch 88 is actuated by contact with the stop plate 84. The limit switch 88 produces an electrical signal which is utilized to stop the drive motor and/or to activate an indicator 85 (FIG. 6) associated with that particular drive sprocket, whereby the identity of the sprocket and thus the location of the obstruction will be made known to maintenance personnel. That is, when an obstruction occurs the downstream sprocket located nearest to the obstruction pulls on the chain and "feels" the resistance to travel before any of the other sprockets. Stoppage of the motor can be accomplished in any desired manner such as by activating a bypass valve 89 (FIG. 6) in a hydraulic circuit of the motor to terminate the drive. If an electric motor is employed, a shut-off switch or clutch can be actuated to terminate the output of the motor.

IN OPERATION, the motor 30 simultaneously drives both drive shafts 36A, 36B so that all of the sprockets 24A, 24B rotate in unison. The springs 82 normally prevent any relative movement between the arms 55 and the stop plates 84. However, if a pan jam-up occurs which obstructs conveyor travel, relative rotation of the arm 55 relative to the stop plate 84 will occur in the nearest downstream sprocket when the rotary forces from the drive shaft 36A or 36B overcome the combined resistance of the springs 82. As a result, the limit switch 88 approaches and engages its associated stop plate 84, whereupon the switch 88 is activated to stop the drive motor, and/or indicate which sprocket has been activated, thus pinpointing to a great extent the location of the obstruction. Consequently, the maintenance personnel are able to quickly locate the obstruction. By dividing the spring resistance among three circumferentially spaced springs 82, the drive forces from the drive shaft are imposed more uniformly around the sprocket. Moreover, when the obstruction has been cleared, the radial arms 55 and their respective slip assemblies automatically assume a normal relationship due to the bias of the springs 82 and thus do not have to be manually "reset" before the conveyor is restarted.

The tension in the springs 82 can be varied by rotating the nuts 80, 82 to vary the "preset" amount of resistance to conveyor travel which triggers the switch 88.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A conveying apparatus comprising:
   an endless conveyor,
   a motor driven rotary drive shaft,
   a rotary force transfer mechanism driven by said drive shaft and operatively connected to said conveyor for advancing said conveyor, said force transfer mechanism comprising:
   a conveyor engaging portion,
   a force applying portion connected to said drive shaft, and
   yieldable force-transmitting means interconnecting said conveyor engaging portion and said force-applying portion, and being yieldable to permit the latter to move relative to the former, in response to the conveyor encountering a resistance to travel, while said force-transmitting means remains in rotary force-transmitting relationship with said conveyor engaging portion, said force-transmitting means comprising at least one biasing means which is loaded in a tangential direction in response to said relative movement, and
   sensing means carried by said force transfer mechanism and arranged for activation in response to said relative movement of said force-applying portion with respect to said conveyor engaging portion, said sensing means emitting a signal upon being activated.

2. A conveying apparatus according to claim 1, wherein said force applying means comprises an arm connected to said shaft, said conveyor engaging portion comprising a slip assembly connected to said arm for movement relative thereto, said biasing means acting between said slip assembly and said arm, and said sensing means comprising a switch mounted on one of said arm and slip assembly and arranged to engage a stop plate on the other of said arm and slip assembly.

3. A conveying apparatus according to claim 1, wherein said conveyor is arranged in helical fashion.

4. A conveying apparatus according to claim 1, wherein all of said drive members carry a said sensing means.

5. A conveying apparatus according to claim 1 wherein said drive shaft is vertically oriented, there being a plurality of said force transfer mechanisms attached to said shaft in vertically spaced relationship, said conveyor being arranged to travel in vertically spaced runs past said force transfer mechanisms.

6. A conveying apparatus according to claim 5, wherein said conveyor is arranged to travel in a helical path.

7. A conveying apparatus according to claim 1, wherein said force applying portion includes at least one radial arm attached fixedly to said drive shaft, said conveyor engaging portion including a ring gear connected to said arm such that said arm is rotatable relative to said ring gear, said force-transmitting means comprising spring means for yieldably transmitting drive forces from said arm to said ring gear and being yieldable in a tangential direction in response to said ring gear encountering a resistance to conveyor travel to permit said arm to rotate relative to said ring gear in order to activate said sensing means.

8. A conveying apparatus according to claim 7, wherein each sensing means comprises a limit switch connected for movement with one of said arm and ring gear, and a stop member connected for movement with the other of said arm and ring gear, said limit switch being activated in response to making contact with said stop member.

9. A conveying apparatus according to claim 7, wherein said ring gear is carried by a slip plate, the latter being connected to said arm by a slip connection.

10. A conveying apparatus according to claim 7, wherein there are a plurality of said arms, said spring means comprising a corresponding plurality of springs.

11. A conveying apparatus according to claim 1, wherein said sensing means is operably connected to said motor to terminate the driving action upon being activated.

12. A conveying apparatus for conveying dough products through a treatment chamber, comprising:
an endless conveyor arranged in a helical pattern to define a plurality of vertically spaced conveyor runs, said conveyor including carriers for transporting dough products through the treatment chamber,
an upright drive shaft driven by a motor,
a plurality of vertically spaced rotary drive sprockets mounted on said drive shaft for common rotation therewith, said drive sprockets being in engagement with respective conveyor runs to advance same, each drive sprocket comprising:
a hub fixed to said shaft,
a plurality of radial drive arms attached fixedly to said hub,
a slip assembly connected to said drive arms by means permitting said drive arms to rotate relative to said slip-assembly, said slip assembly including a conveyor-engaging ring gear,
means for exerting forces which resist relative rotation between said drive arm and said slip assembly and being yieldable in response to said ring gear encountering a resistance to conveyor travel greater than a preset amount, whereby relative rotation is permitted between said drive arms and slip assembly while said drive arms remain in rotary force-transmitting relationship with said slip assembly, said means for exerting forces comprising at least one biasing means which is loaded in a tangential direction in response to said relative rotation, and
sensing means mounted on said sprocket for being activatable in response to a preselected amount of relative force of said drive arm relative to said ring gear for generating a singal identifying the respective drive sprocket encountering the resistance to conveyor travel.

* * * * *